United States Patent [19]

Terryn

[11] 3,811,034

[45] May 14, 1974

[54] SIGNAL RECOGNITION SYSTEM

[75] Inventor: Raymond Martin Florent Terryn, Borgerhout, Belgium

[73] Assignee: International Standard Electric Corporation, New York, N.Y.

[22] Filed: Apr. 4, 1972

[21] Appl. No.: 241,041

[30] Foreign Application Priority Data

Apr. 8, 1971 Netherlands ..................... 714722

[52] U.S. Cl. ..................235/61.11 R, 235/61.11 E, 340/174.1 H, 146.3 K, 223

[51] Int. Cl. ..... G06k 7/00, G06k 7/016, G06k 9/00

[58] Field of Search ............235/61.11 R, 61.11 D, 235/61.11 E; 340/146.3 K, 174.1 H, 167, 340/170, 223; 250/219 D; 324/78 D, 78 Z, 79 D; 328/109, 155; 178/67, 69.5

[56] References Cited

UNITED STATES PATENTS

| | | | |
|---|---|---|---|
| 3,304,504 | 2/1967 | Horlander | 324/78 D |
| 3,514,697 | 5/1970 | Oswald | 324/78 D |
| 3,263,064 | 7/1966 | Lindars | 324/78 D |
| 3,686,565 | 8/1972 | Kelem et al. | 324/78 D |
| 3,566,081 | 2/1971 | Goldman | 235/61.9 R |

*Primary Examiner*—Thomas J. Sloyan
*Attorney, Agent, or Firm*—John T. O'Halloran; Menotti J. Lombardi, Jr.; Alfred C. Hill

[57] ABSTRACT

This signal recognition arrangement is disclosed to read, for example, a document stamp comprising five vertical bars, wherein no synchronization is required in taking into consideration document speed variations relative to the counting operation based on generated clock pulses (period of T2). In taking these variations into account the period of the signal to be recognized is allowed to change between two predetermined limits (N1T2 and N2T2), each determined by a whole number of clock pulse periods. Each time two consecutive input signals of a series of input signals of period $T_1$ ($T_1$ much greater than clock pulse period $T_2$) disposed between the predetermined limits are detected, a pulse is recorded in a four-count counter. A count of four in the counter records a recognition signal in a register, which recognition signal means that the five consecutive input signals have been recognized.

6 Claims, 8 Drawing Figures

SIGNAL RECOGNITION SYSTEM

BACKGROUND OF THE INVENTION

The present invention relates to a signal recognition system to recognize the presence of at least two successive input signals, nominally spaced by a first tine interval T1, said system including generator means to generate at least one series of clock pulses spaced by an amount equal to a second time interval T2, which is smaller than said first time interval, and recognition means having at least a first input and a second input, said input signals and said clock pulses being fed to said first and second inputs, respectively.

Such a system is known from the Belgian Pat. No. 666,126. The purpose of this known system is to recognize *m*-out-of-*n* codes represented by the presence or absence of input signals obtained by reading a pattern of bars forming a code and printed in *m* out of *n* possible positions on an advancing document going past the signal recognition system, there being a start signal preceding the code. These start and input signals are fed to a shift register and are advanced therethrough by advancing pulses, extracted out of a clock pulse stream. In order that the code should be correctly read into the shift register the advancing pulses are positioned substantially in the middle of the time element determined by any two successive positions out of the n possible ones. This necessitates a synchronization between the rate at which the bars are scanned and the clock pulse frequency. The synchronizing means consist of a rotating disk geared to the speed of advancement of the documents and cooperating with photocell equipment to produce the clock pulses. However, in some applications it may be desirable to detect only the presence of a minimum number of successive input signals spaced by a time interval T1 which may be disposed between allowed the time limits and without the need to recognize particular code combinations. Thus, it is no longer necessary to have an advancing pulse located within fairly precise limits in the middle of each time element.

SUMMARY OF THE INVENTION

Therefore, it is an object of the present invention to provide a system of the above type wherein no such synchronizing means are required.

The present signal recognition system is characterized in that said recognition system includes comparison means to compare said first and second time intervals and to deliver at their output a third signal indicating the recognition of the presence of said input signals when N1T2 < T1 < N2T2, wherein N1 and N2 are predetermined positive integers with N2 > N1 > 1.

In a preferred embodiment, the input signals to be recognized having a nominal period T1 are fed to the binary "1" - input of the first stage of a shift register having (N2+1) stages and are advanced through the shift register by clock pulses having a period T2. Gating means are fed from the input to the first stage and from the output of all stages and are designed to give an OK signal indicating that the time interval T1 spacing two successive input signals is between N1T2 and N2T2 (N2 > N1 > 1) if the shift register records binary "0" for the first stage and the binary combination 10 at least for the (N2−1) N2 stages in that order, or for the N2 and (N2+1) stages in that order, while simultaneously this binary combination is not recorded for any pair of consecutive stages starting with the second and ending with the pair of stages (N2−2), (N2−1).

The effects of the above will become clear from the following explanation:

The purpose of this invention is to have an OK signal produced at the output of the gating means when the time interval T1 between two successive input signals is disposed between two consecutive numbers N1 and N2 = (N1 + 1) of clock pulse periods, i.e., during a time interval (N2 − N1) T2 = T2.

It is, of course, essential that the duration of an input signal should normally be at least equal to T2 in order to ensure that at least one shift register stage will be placed in the binary "1" - condition. But, depending on the length of the input signal, two successive stages or more (if this length is at least equal to 2T2) may eventually be placed in the "1" - condition.

Assume that T1 is equal to the lower limiting value N1T2. In this case, when the second input signal reaches the input of the first stage of the shift register, the latter will read "0" provided there was a sufficient minimum interval between the first and the second input signals. At this moment, the N1th stage will be in the "1" - condition and the (N1+1)th and (N1+2)th in the "0" - condition.

Depending on the length of the first input signal and its relative phase with respect to the clock pulses, the (N1−1)th stage will either be in the "1" or in the "0" - condition. Irrespective of this, however, an OK signal will be generated by the gating means as may be readily verified.

Assuming now that T1 is equal to the upper limiting value (N1+1)T2, it will be clear that the above reasoning is correct provided the N1th stage becomes the (N1+1)th and again, the gating means will provide the OK signal.

On the other hand, if T1 is smaller than N1T2 or larger than N2T2, for instance, if T1 is equal to (N1−1)T2 or (N2+1)T2 the (N1−1)th stage and the (N2+1)th stage will be in the "1" - state when a second input signal reaches the first stage of the shift register. When this is the case no OK signal will be produced as may be readily verified.

BRIEF DESCRIPTION OF THE DRAWING

The above mentioned and other objects and features of the invention will become more apparent and the invention itself will be best understood by referring to the following description of embodiments taken in conjunction with the accompanying drawings in which.

DESCRIPTION OF THE PREFERRED EMBODIMENTS

Principally referring to FIG. 1 a first embodiment of the signal recognition system will be described hereinafter. This embodiment includes a shift register with (N2+1) bistable devices or stages indicated by FF1, FF2, . . . , FF(N2 + 1). The "1" - and "0" - outputs of each of the bistable devices FF1 to FFN2 of the shift register are connected to the "1" - and "0" - inputs of the immediately following bistable devices FF2 to FF(N2 + 1), respectively. The common inputs of all the bistable devices FF1 to FF(N2 + 1) are connected to the output terminal CP of a clock pulse generator (not shown) adapted to generate clock pulses of period T2 which is much smaller than T1. The "1" - input of the first bistable device FF1 is connected, on the one hand, to the output terminal SIS1 of an input signal generator (not shown) and, on the other hand, to one of the inputs of a two-input AND-gate A2. The "0" - input of bistable device FF1 is connected to the output terminal SIS1 via an inverter I1. The other input of AND-gate A2 is connected to the "0" - output of the same bistable device FF1. The "1" outputs of the bistable devices FF2 to FFN2 are connected to one of the inputs of the two-input AND-gates A3 to A(N2 + 1), respectively, while the other inputs of these gates being connected to the "0" - outputs of the bistable devices FF3 to FF(N2 + 1), respectively. The outputs of the AND-gates A3 to AN1 are connected to the inputs of an OR-gate OR1 the output of which is connected via an inverter I2 to one of the inputs of a three-input AND-gate A. The outputs of AND-gates AN2 and A(N2 + 1) are connected to the inputs of an OR-gate OR2 the output of which is connected to the second input of the AND-gate A. The third input of gate A is connected to the output of the gate A2. The output of gate A is connected to the input of a counter C1 the output of which is connected to a registering means R. It should be noted that the above mentioned bistable devices FF1 to FF(N2 + 1) of the shift register are normally in their "0" - condition with their "0" - and "1" - outputs activated and deactivated respectively. These bistable devices are of so called master-slave type well known in the art, e.g., Texas Instruments type SN 7472. Each of these bistable devices can only change its state when a clock pulse is applied to its common input, this change of stage occurring more particularly during the trailing edge of the clock pulse. For example, when the bistable device FF1 is in its "0" - state, it can only be brought in its "1" - state when simultaneously its "1" input is activated and a clock pulse is applied to its common input.

The operation of the above described first embodiment illustrated in FIG. 1 will be described hereinafter, reference being made to FIGS. 2 and 3.

Figure 2:
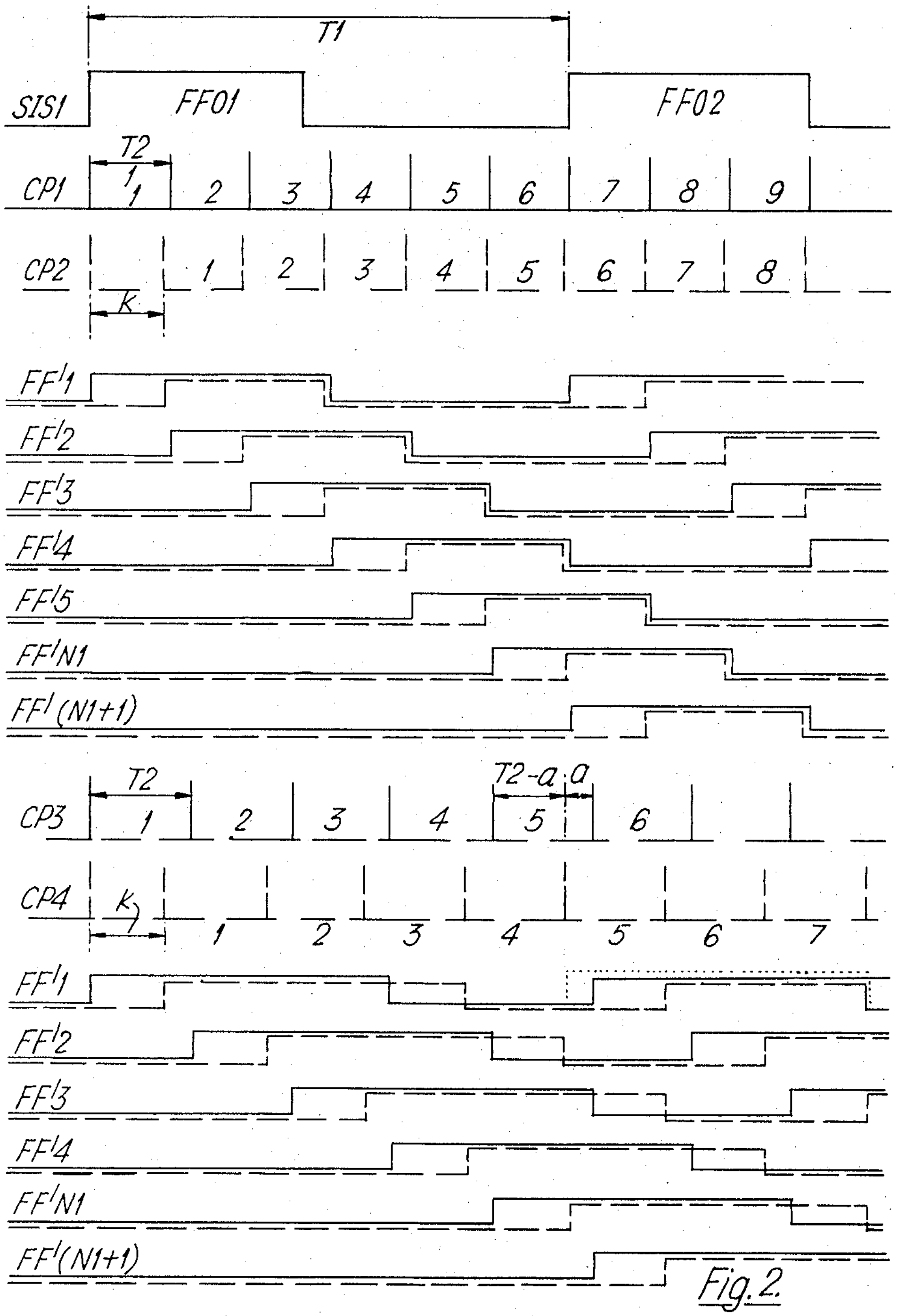
FIG. 2 is a set of curves illustrating the input signals and the stages of the different stages of a shift register included in the first embodiment of FIG. 1.

Principally referring to FIG. 2, curve SIS1 represents a series of input signals FF01, FF02, etc. having a period T1, curves CP1, CP3 and CP2, CP4 indicate clock pulses having a period T2 which are in phase (full lines) and lagging with a phase shift equal to *k* (dashed lines) with respect to the input signals, respectively. The period T1 of the input signals FF01, FF02 is equal to a whole number of clock pulse periods of the clock pulses CP1 or CP2, while period T1 is disposed between two consecutive number of clock pulses periods of clock pulses CP3 and CP4. Curves FF'1 to FF'(N1 + 1) represent the corresponding states of the bistable devices of the shift register. In these curves the full lines and dashed lines refer to the clock pulses CP1, CP3 and CP2, CP4, respectively.

For the simplicity of explanation consider first the condition where N1 = (N2–1), N1 being any integer disposed between 1 and (N2 – 1) as will become apparent at the end of the description of this embodiment. It should be noted that N1 and N2 satisfy the general relation N1T2 < T1 < N2T2. In order to facilitate the comprehension of later explanations the following cases are first considered:

1. N1T2 = T1

From the upper part of FIG. 2 it follows that after a period T1 = N1T2 (N1 = 6 in this illustration) has elapsed and a second input signal (FF02) is present at the input SIS1 the following conditions are satisfied:

FF'1 = "0", FF'N1 = "1", FF'(N1 + 1) = "0" for every value of the phase shift *k* disposed between 0 and T2. This implies obviously that the pulse length of the input signal is larger than T2. The condition of the presence of an input signal will be indicated by FF0 = "1". The conditions FF0 = "1" and FF'1 = "0" are also prevalent for *k* = 0 because FF1 is put in its "1" - state by the rear edge of the clock pulse.

2. N1T2 > T1 > (N1–1)T2

From the lower part of FIG. 2 it can be determined that when T1 is disposed between the above mentioned limits (N1 = 5 in this illustration) the above conditions FF0 = "1", FF'1 = "0", FF'N1 = "1" and FF'(N1 + 1) = "0" are satisfied for all values of *k* disposed between 0 and (T2–*a*). Since the probability that the phase shift *k* of input signals having period T1, satisfying the above relation, is disposed between 0 and (T2–*a*) is equal to (T2–*a*)/T2, the probability that the above conditions are satisfied for these signals is also equal to (T2–*a*)/T2. For the input signals of period T1 for which the phase shift *k* is disposed between (T2–*a*) and T2 the above mentioned conditions are not satisfied. Indeed for these input signals FF'1 = 1, as shown by the dotted line in curve FF'1 of the lower part of FIG. 2.

3. N1T2 < T1 < (N1 + 1)T2.

This case corresponds to the foregoing one wherein (N1–1) and N1 are replaced by N1 and (N1 + 1), respectively. From the lower part of FIG. 2 wherein curve FF'4 is considered as FF'N1 and curve FF'N1 is considered as FF' (N1+1), it can be determined that the conditions FF0 = "1" FF'1 = "0" FF'N1 = "1" and FF'(N1 + 1) = "0" are satisfied for all values of the phase shift *k* disposed between (T2–*a*) and T2. For input signals of period T1 for which the phase shift *k* is disposed between 0 and (T2–a), FF1 = "0", FF'N1 = "1" and FF'(N1+1) = "0", but FF0 = "0". Similarly from the previous case (2), the probability that the above conditions are satisfied for these input signals is equal to T2−(T2−*a*)/T2 = *a*/T2.

4. T1 > (N1 + 1) and T1 < (N1−1)T2.

From the above it follows that for input signals of period T1 with the appropriate phase shift *k* disposed between the limits (N1 + 1) T2 and (N1−1)T2, the conditions FF0 = "1", FF'1 = "0", FF'N1 = "1" and FF'(N1+1) = "0", are satisfied simultaneously. These conditions, although necessary, are not sufficient. Indeed, the above relations N1T2 < T1 < (N1 + 1)T2 and N1T2 > T1 > (N1 − 1) T2 may also be written N1T2 < dT'1 < (N1 + 1)T2 and N1T2 > dT'1 > (N1−1)T2 wherein dT'1 = T1. *d* may be chosen such that T'1 may be outside the limits (N1 + 1)T2 or (N1−1)T2.

Figure 4:
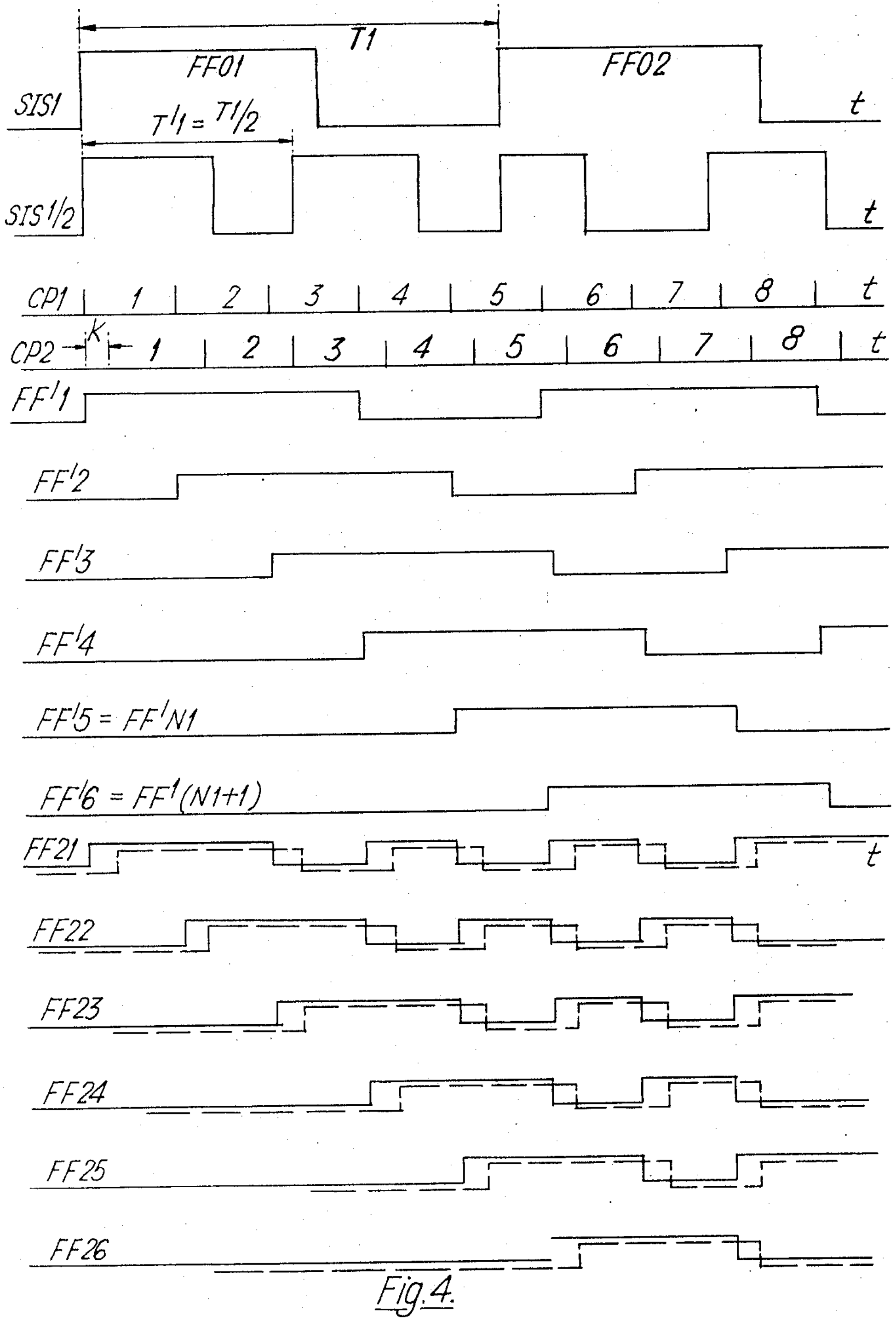
FIG. 4 is a set of curves illustrating a different series of input signals having different periods and the states of the different stages of a shift register included in the first embodiment of FIG. 1.

However, input signals for which T'1 is larger than (N1 + 1)T2 are not to be considered because the condition FF0 = "1" will not be satisfied for these input signals when simultaneously FF'1 = "1", FF'N1 = "1" and FF'(N1+1) = "0" so that only input signals having a period T'1 smaller than (N1+1)T2 and such that an integer number of T'1 are equal to T1 may give rise to the above mentioned necessary conditions. This can be determined from FIG. 4, wherein curves SIS1, SIS ½, CP1, CP2, FF'1 to FF'6 and FF21 to FF26 illustrate a series of two input signals as a function of time having a period T1, a series of four input signals as a function of time having a period T'1 = T1/2, clock pulses in phase with the input signal and, clock pulses having a phase shift *k*, the states of the bistable devices FF1 to FF6 relative to the input signals having a period T1 and the states of the bistable devices FF1 to FF6 relative to the input signals having a period T'1 respectively. The full lines represent the states of bistable devices FF21 to FF26 relative to the clock pulses CP1 and the dashed lines represent the states of bistable devices FF21 to FF26 relative to the clock pulses CP2. In this particular example T'1 < 3T2 and, hence, falls outside the limits (N1−1)T2 = 4T2 and (N1 + 1)T2 = 6T2.

In this case, however, the transition from binary "0" to binary "1" is present more than once in the stages 1 to N1 of the shift register. Therefore, it may be concluded that the necessary and sufficient conditions, for which input signals of period T1 are situated within the limits (N1−1)T2 and (N1+1)T2 with the appropriate phase shift as specified above, are:

FF0 = "1", FF'1 = "0", FF'N1 = "1", FF'(N1+1) = "0"; (41)
no transition from the "1" - to "0" - state in the shift register stages 1 to (N1 − 1) (42) (4)

Figure 1:
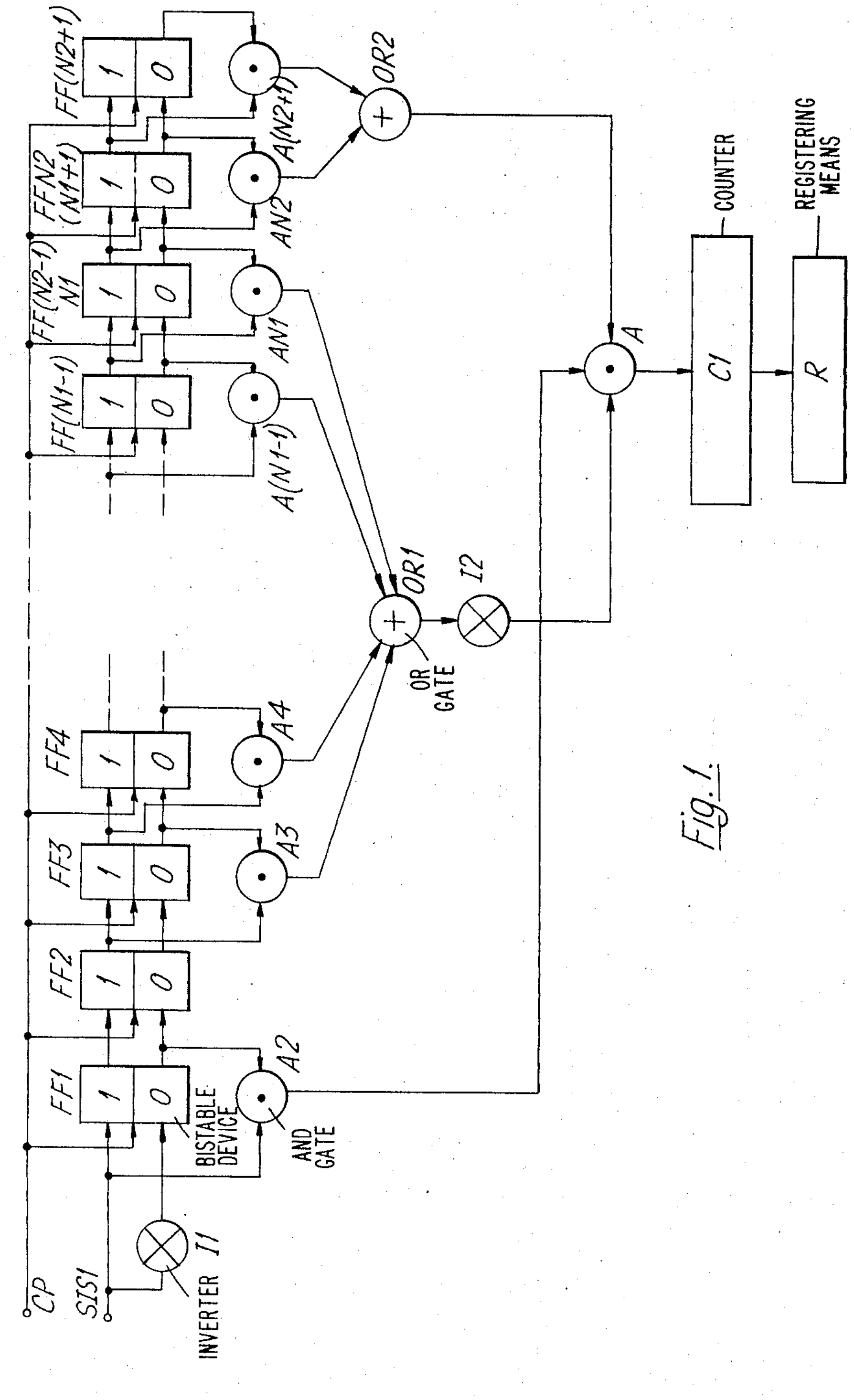
FIG. 1 is a schematic block diagram of a first embodiment of a signal recognition system according to the present invention.

From FIG. 1 it follows that the outputs of the AND-gate A2 and of the OR-gates OR1 and OR2 are activated so that an output signal is produced at the output of the AND-gate A when the above mentioned necessary and sufficient conditions are satisfied. As mentioned above, the probability that the conditions (4) are satisfied is equal to (T2−*a*)/T2 or *a*/T2 for input signals having a period T1 disposed between (N1−1)T2 and N1T2, or N1T2 and (N1+1)T2, respectively. This probability is not changed by the new condition (42), which is independent of the phase shift *k*. This means that the probability of having an output signal generated is also (T2−1)/T2 or *a*/T2 following the case considered. This probability called detection probability *p* is illustrated on FIG. 3 in full lines.

The reasoning held in the different cases 1,2,3,4 hereabove is obviously valid when substituting N2 for N1 and from FIG. 1 it can be derived that an output signal will be produced at the output of the AND-gate A when the following conditions are satisfied:

FF0 = "1", FF'1 = "0", FF'N2 = "1", FF'(N2 + 1) = "0" (51);)
no transition from the "1" - to "0" - state in the shift) register stages 1 to (N2 −1). (5)

From FIG. 1 it follows that the outputs of the AND-gate A and of the OR-gates OR1 and OR2 are activated so that an output signal is produced at the output of the AND-gate A when the above mentioned conditions (5) are satisfied. Similarly to the case where N1 is considered, the probability of having an output signal generated is (T2−1)/T2 or *a*/T2 following the period T1 of the input signals disposed between (N2−1)T2 and N2T2, or N2T2 and (N1+1)T2, respectively. This detection probability *p* is represented on FIG. 3 in dashed lines.

Due to the previously mentioned assumption N2−N1 = 1 two consecutive input signals having a nominal period T1 disposed between N1T2 and N2T2 will produce an output signal for every value of the phase-shift *k* disposed between 0, (T2−*a*) and (T2−*a*), T2, i.e., between 0 and T2, because T1 will be disposed at the same time between N1T2 and (N1 +1)T2 and (N2−1)T2 and N2T2. The detection probability will thus be 1 within the limits N1T2 and N2T2. Outside these limits the detection probability decreases linearly from 1 to 0 in the regions N1T2 to (N1−1)T2 and N2T2 to (N2+1)T2. This detection probability *p* is illustrated in FIG. 3 by the dashed-dotted line.

It should be noted that the system is designed in such a way that the probability *p'* of finding input signals having a nominal period T1, situated outside the limits N1T2 and N2T2 is very small, so that when this occurs the total detection probability *pp'* is very small.

As described above, every time two consecutive input signals of a series of input signals of period T1 disposed between N1T2 and N2T2 are detected, an output or OK signal is produced at the output of the AND-gate A. This OK signal steps the counter C1 which is able to count four. Each time this number has been counted a recognition signal is stored in the registering means R. In this case this recognition signal means that five consecutive input signals have been recognized.

It should also be noted that as the probability *pp'* is very small, the probability of having detected two input signals of a nominal period T1 situated outside the above mentioned limits is $(pp')^2$ so that when the counter C1 counts at least two before a recognition signal is registered in the registering means the probability of having an erroneous signal recognized can practically be neglected.

It should further be noted that, when the counter C1 has counted four, the clock pulses CP are prevented from entering the shift register. When a second series of input signals is fed to the signal recognition system the counter C1 is reset and the clock pulses are allowed to reenter (not shown).

Figure 5:
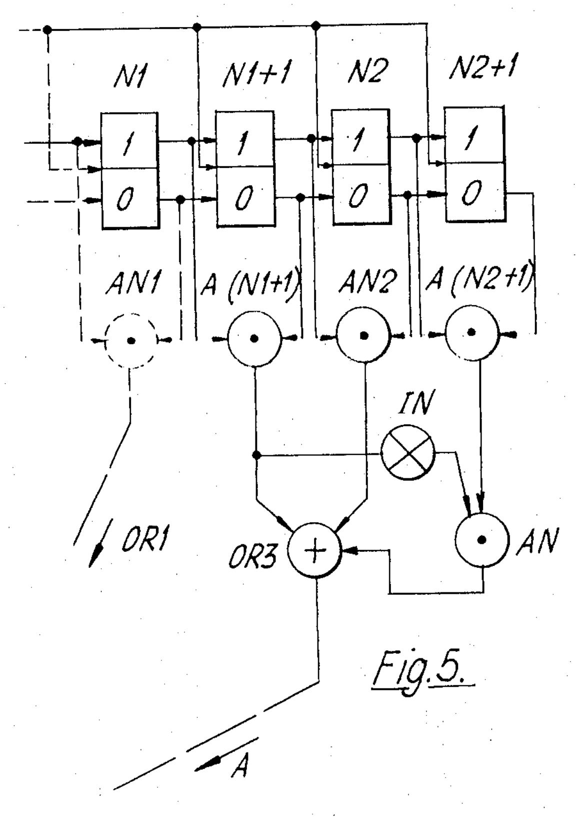
FIG. 5 is a schematic block diagram of part of a modified first embodiment of FIG. 1.

The circuit illustrated in FIG. 1 may be modified in order to supply an output signal when N2−N1 > 1. The case N2−N1 = 2, for instance, has been illustrated in FIG. 5 where only the differences with respect to the circuit of FIG. 1 have been indicated. In this case the shift register has a supplementary stage (N1 + 1). The "1" - outputs of the stages N1, (N1+1) and N2 are connected to one of the inputs of the two-input AND-gates A(N1+1), AN2 and A(N2+1) respectively. The other inputs of these gates are connected to the "0" - outputs of the stages (N1+1), N2 and N2+1, respectively. The output of the AND-gate A(N1+1) is connected, on the one hand, to the input of a 3-input OR-gate OR3 and, on the other hand, to the input of an inverter IN. The second input of OR-gate OR3 is connected to the output of the AND-gate AN2, while its third input is connected to the output of the AND-gate AN. One input of the latter gate is connected to the output of the AND-gate A(N2+1) while the other input thereof is connected to the output of the inverter IN. The output of the OR-gate OR3 is connected to one of the inputs of the AND-gate A. It can easily be verified that the conditions

FF0 = "1", FF'1 = "0", FF'N1 = 1 FF'(N1+1) = "0";

no transition from the "1" - to "0" - state in the shift register stages 1 to (N1−1), (6)

FF0 = "1", FF'1 = "0", FF'(N1+1) = 1 FF'N2 = "0";

no transition from the "1" - to "0" - state in the shift register stages 1 to N1, (7)

FF0 = "1", FF'1 = "0", FF'N2 = "1" FF'(N2+1) = "0";

no transition from the "1" - to "0" - state in the shift register stages 1 to (N1 + 1) (8)

are satisfied (not simultaneously for input signals having a period T1 disposed between (N1−1)T2 and (N2+1)T2 with the appropriate phase shift *k*. The detection probability of a series of input signals of period T1 disposed between N1T2 and N2T2 is one and *p* varying from 1 to 0 in the regions N1T2 to (N1−1)T2 and N2T2 to (N2+1)T2.

Figure 3:
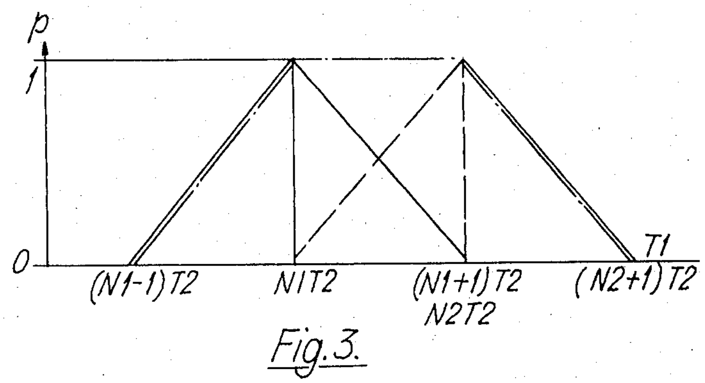
FIG. 3 is a probability detection curve to be used in conjunction with FIGS. 1 and 2.

There is obtained a detection probability curve similar to that of FIG. 3 except that the zone where $p = 1$ extends from N1T2 to N2T2 with N2−N1 = 2. It is clear that this case can be extended to N2−N1 = *n*, where $n > 2$. It should be noted that as N1 and N2 are two integers of which N1 is larger than 1, n may be any integer of the series 1,2, . . . , (N2−2) $n = 1$ being the lowest accepted value of *n*.

Principally referring to FIG. 6 a second embodiment will be described hereinafter. FF1, FF2 and FF3 indicate the bistable devices or stages of a shift register. The "1" - and "0" - outputs of each of the bistable devices FF1 and FF2 are connected to the "1" - and "0" - in puts of the immediately following bistable device FF2 and FF3, respectively. The common inputs of all the bistable devices are connected to the output terminal CP' of a clock pulse generator providing clock pulses of period T'2. The "1" - input of the first stage FF1 is connected to the output terminal SIS1 of an input signal generator (not shown), while the "0" - input is connected to the same output via an inverter I1. The "1" - output and the "0" - output of the first and the second shift register stages, respectively, are connected to the first two inputs of a four input AND-gate A, the third and the fourth inputs of which are connected to the output terminal CP' and to the output of a two-input OR-gate OR, respectively. The output of the AND-gate A is connected to the input of a counter C1 the output of which is connected to the input of a registering means R. The inputs of the OR-gate OR are connected to the N1th and N2th stages of a counter C2, which counts to (N2+1). Hereby it should be noted that the stages 1 to (N2+1) of the counter schematically represent outputs which are activated when the counter has counted 1 . . . , (N2+1), respectively. The output of last stage (N2+1) is connected via an inverter I2 to one of the inputs of a two-input AND-gate A2, the other input of which is connected to the output terminal (CP) of a clock pulse generator generating clock pulses of period T2 much larger than T'2. The output of the gate A2 is connected to the input of the counter C2 the reset input of which is connected to the output of a three-input AND-gate A1, the inputs of which are connected to the "1" - outputs of the second stage of the shift register, the "0" - output of the third stage of said shift register and the output CP' of the clock pulse generator generating clock pulses of period T'2, respectively. The shift register bistable devices are analogous to those used in the shift register shown in the first embodiment of FIG. 1 and it is being assume that the shift register contains no information and that the counter C2 is in its zero condition.

The operation of the above described signal recognition system will be described hereinafter, reference being made to FIGS. 3 and 6 to 8.

Figure 7:
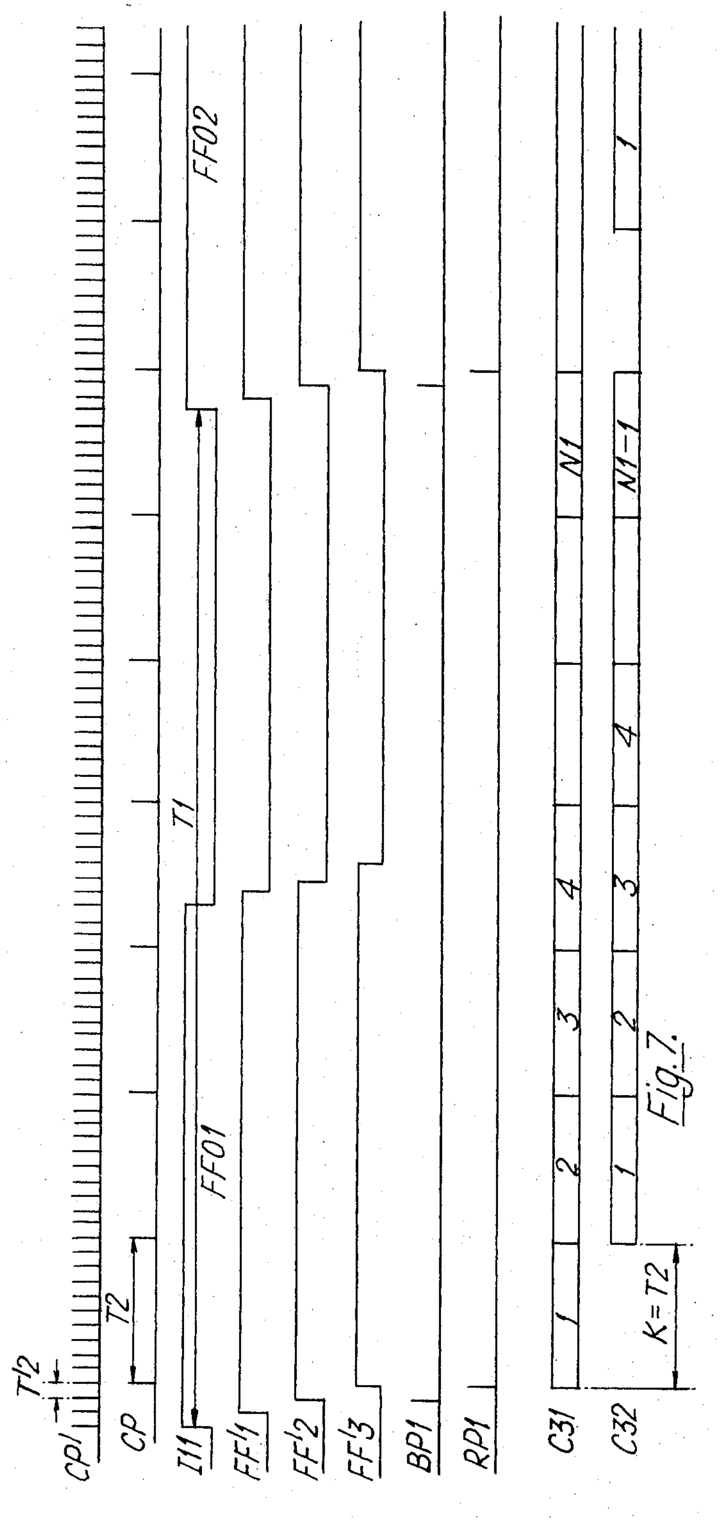
FIGS. 7 and 8 are a set of curves illustrating the input signal and the states of the stages of a shift register and a counter included in the second embodiment of FIG. 6.
Figure 8:
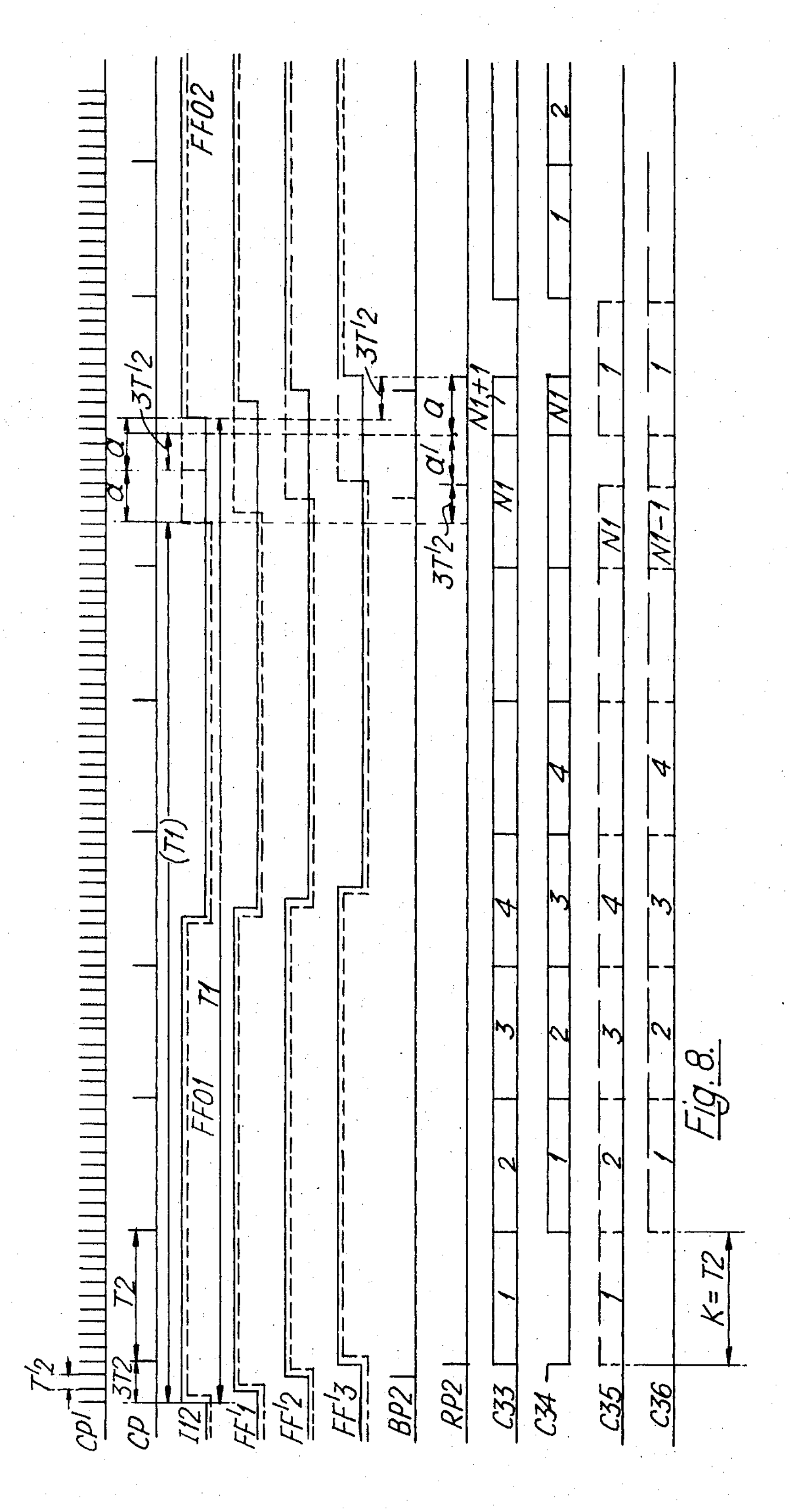

In FIGS. 7 and 8, curves CP' and CP represent the clock pulses of period T'2 and T2, respectively. The period T2 is of the order of hundred times the period T'2. I11 curves and I12 represent a series of input signals FF01, FF02, . . . . The period T1 of curve I11 is equal to a whole number of clock pulse periods T'2 the period T1 of curve I12 is different from a whole number of clock pulse periods T'2. Curves FF'1, FF'2 and FF'2 illustrate the states of the first, second and third stage of the shift register, respectively. The first bistable device FF1 and the following stages FF2 and FF3 remain in the "1" - state as long as an input signal is present and as long as the previous stage is in the "1" - state. When input signals are applied to the input terminal SIS1, the bistable devices FF1, FF2 and FF3 are successively set by successive clock pulses CP' applied to the common input terminal CP' of the shift register. As mentioned in relation to the first embodiment of FIG. 1, the changes from one state to another occur only during trailing edges of the clock pulses CP'. More particularly the bistable devices FF1, FF2 and FF3 are set by the trailing edges of a second, a third and a fourth pulse CP' as shown, respectively. Since FF2 is brought in its "1" - condition by the trailing edge of a clock pulse CP' (the third clock pulse for a first input signal), curve BP1 as well as curve BP2 represent the time interval during which the "1" - output of the bistable device FF1, "0" - output of the bistable device FF2 and the output terminal CP' are simultaneously activated, i.e., the time interval during which the inputs 1, 2, 3 of the AND-gate A are simultaneously activated. In the same way since FF3 is brought in its "1" condition by the trailing edge of a clock pulse CP' (the fourth clock pulse for the first input signal), curve RP1 as well as curve RP2 illustrate the time interval during which the "1" - output of the bistable device FF2, the "0" - output of the bistable device FF3 and the output terminal CP' are simultaneously activated, i.e., time interval during which the reset input of the counter C2 is activated. The time intervals or pulses BP1, BP2 and RP1, RP2 will be called input signal detecting pulses and reset pulses, respectively.

As mentioned earlier the clock pulse period T'2 is as small as a hundredth of the clock pulse period T2, which is smaller than T1, and T1 is of the order of a thousand times the period T'2. The signal detection pulses BP1 (or BP2) are practically separated by a period T1 of the input signals. The reset pulses RP1 (or RP2) following the BP pulses, are practically produced at the beginning and the end of the period T1 of two consecutive input signals, and are produced at a maximum of 3T'2 after the beginning and the end of the period T1. After a reset pulse has been applied to the reset input of the counter C2, it starts counting with the next following clock pulse Cp having a phase shift k with respect to the immediately proceeding reset pulse. By neglecting the time interval between the start of an input signal and the reset pulse (maximum 3T'2), k is also the phase shift of the start of the counter C2 with respect to the input signal. Curves C31, C33, C35 and C32, C34, C36 schematically illustrate the states of the outputs of counter C2, called hereinafter the stages of the counter C2, where the clock pulses CP stepping this counter are in phase or lagging a time interval T2 with respect to the first input signal, respectively. As in the foregoing embodiment it is assumed that N2–N1=1 and the following different cases are considered:

1. N1T2 = T1

For simplicity of description, it is assumed that in this case (1) and the following cases 2, 3, 4 the output of the stage N1 of counter C2 is directly connected to the fourth input of the gate A without considering the OR-gate OR. With reference being made to FIGS. 6 and 7, curve C31 represents the state of the different stages 1, 2, . . . ,N1 of the counter C2, as mentioned previously. The clock pulse CP, which starts the counting of the counter C2 is lagging with respect to the input signal by an amount of max. 3T'2, which is neglected. Similarly C32 illustrate the states of the stages of the same counter C2, but where the clock pulse which starts the counting of counter C2 is lagging a time interval T2 with respect to the input signals. From FIG. 7 it can be seen that there is coincidence between BP1 and the "1" state of the N1th stage of the counter C2 for every value of the phase shift $k$ so that an output pulse will then appear at the output of the gate A.

2. N1T2 < T1 < (N1+1)T2

Figure 6:
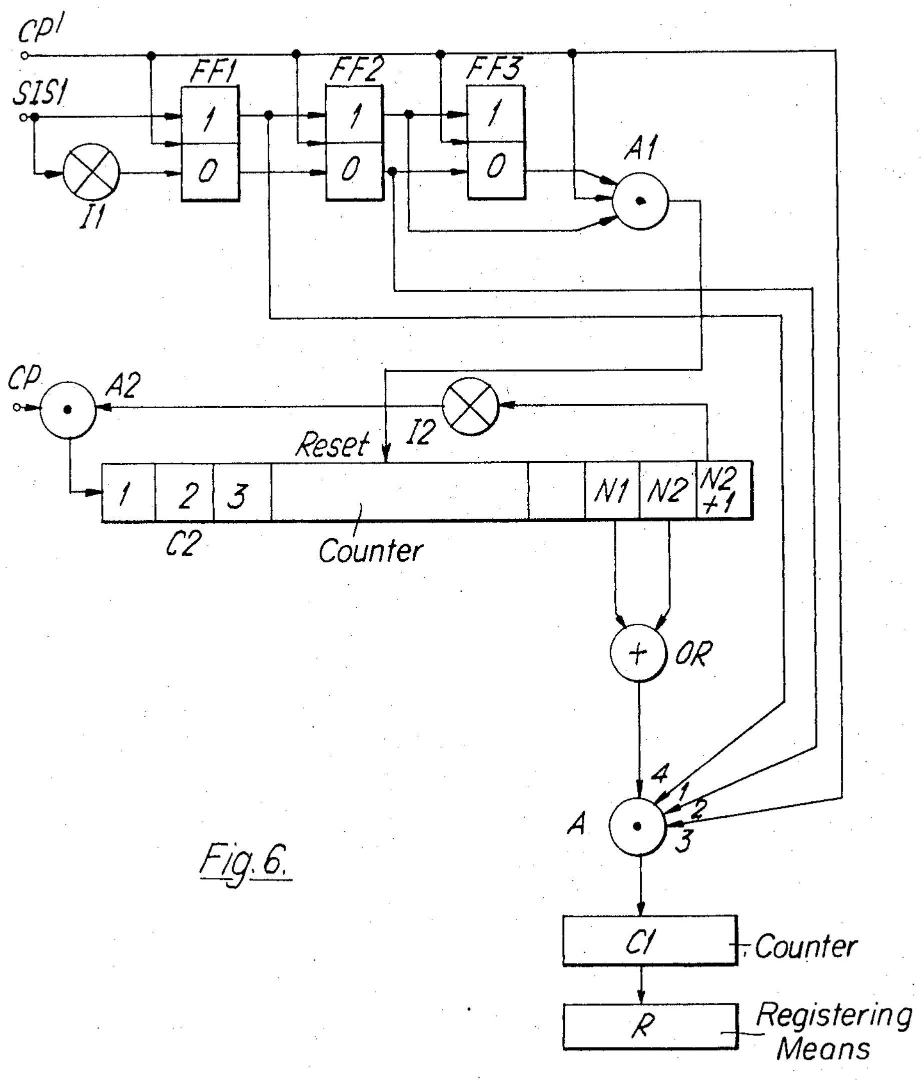
FIG. 6 is a schematic block diagram of a second embodiment of a signal recognition system according to the present invention.

With reference being made to FIGS. 6 and 8 curve 112 illustrates the input signals (full lines) and curves C33 and C34 illustrate the state of the stages of the counter C2 as a function of time for clock pulses CP which are in phase (by neglecting 3T'2 as mentioned earlier) and lagging by an amount T2, respectively.

From FIG. 8 it can be seen that an output signal will be produced at the output of the AND-gate A upon the stage N1 of counter C2 being activated only for the values of the phase shift $k$ disposed between a and T2 with a = T1–N1T2. In the case illustrated N1 = 7. Since only an output signal is generated for every two successive input signals having a time interval T1 disposed between N1T2 and (N1+1)T2 and for which the phase shift k of the clock pulses CP with respect to these input signals is disposed between a and T2, the probability p of having an output signal is thus $(T2-a)/T2$.

3. N1T2 > T1 > (N1–1)T2

With reference being made to FIGS. 6 and 8, curve 112 illustrates the input signals (dashed lines) and curves C35 and C36 illustrate the state of the stages of the counter C2 as a function of time for clock pulses which are in phase and lagging by an amount T2, respectively. From FIG. 8 it can be seen that an output signal will be produced at the output of the AND-gate A upon the stage N1 being activated only for the values of the phase shift $k$ disposed between 0 and $(T2-a')$ with $a'$=N1T2–T1. In the case illustrated N1 = 7. Similarly as for the previous case (2) the probability $p$ of having an output signal for two consecutive input signals having a time interval T1 disposed between (N1–1)T2 and N1T2 is $(T2-a')/T2$. In this case there is obtained a probability curve as illustrated in FIG. 3 (full line) for values of T1 disposed between (N1–1)T2 and (N1+1)T2.

4. T1 > (N1+1)T2 and T1 < (N1–1)T2

In the first case the counter C2 has counted N1+1 during the time interval T1 separating two consecutive input signals while in the second case the counter C2 has not yet counted N1 during the same time interval. In both cases the output of stage N1 of counter C2 is in the deactivated condition at the moment the inputs 1, 2, 3 of the AND-gate A are activated so that no output signal is fed to the counter C1.

The same reasoning can be employed when N1 is substituted by N2 and the probability curve (dashed lines) of FIG. 3 is obtained when the output of the stage N2 of the counter C2 is connected directly to the fourth input of the AND-gate A without considering the OR-gate OR. By connecting the outputs of the stages N1 and N2 (N2–N1=1) to the inputs of the two-input OR-gate OR and the output of this OR-gate to the fourth input of the four input AND-gate A, gate A will produce an output signal for input signals of period T1 disposed between N1T2 and N2T2 and for values of the phase shift $k$ disposed between 0 and $(T2-a')$ and a and T2. Since $(a+a')$ = T2, an output signal will be produced for every value of $k$ disposed between 0 and T2. As in the previous embodiment the dashed-dotted line of FIG. 3 represents the sum of the two probability curves (for N1 and N2).

The circuit illustrated in FIG. 6 may be extended (not shown) to supply an output signal when N2–N1 > 1. It is sufficient to connect the outputs of a number of adjacent stages N1, (N1+1), . . . , (N2–1), N2 of the counter C2 to the inputs of an (N2–N1+1) input OR-gate the output of which is connected to the input 4 of the AND-gate A.

The values N1, (N1+1), . . . , N2 are determined by the conditions

N1T2 < T1 < N2T2 and (N2–N1) = n

N1 > 1

As in the first embodiment of FIG. 1 every time two consecutive input signals of a series of input signals of period T1 disposed between N1T2 and N2T2 are detected, an OK signal is produced at the output of the AND-gate A. This OK signal steps the counter C1, which is able to count, for instance, to four. Each time counter C1 counts to four a recognition signal is stored in the registering means R. In this case this recognition signal means that five consecutive input signals have been recognized.

It should be noted, as already explained in the first embodiment of FIG. 1 that the counter C1 should count at least two before a recognition signal is registered in the registering means.

While the principles of the invention have been described above in connection with specific apparatus, it is to be clearly understood that this description is made only by way of example and not as a limitation on the scope of the invention.

I claim:

1. In a mark sensing organization a signal recognition system to recognize the presence of a plurality of two successive input signals nominally spaced by a first time interval T1 comprising:

a source of said input signals;

generator means to generate at least one series of clock pulses spaced by an amount equal to a second time interval T2, said second time interval being smaller than said first time interval;

detection means coupled to said source and said generator means to produce a third signal indicating the presence of each of said plurality of said input signals having said first time interval varying between two predetermined limits, N1T2 and N2T2, each of said limits being determined by two different whole numbers N1 and N2 of said second time intervals, where N1T2 < T1 < N2T2 and N1 and N2 are predetermined positive integers with N2 > N1 >1, said detection means including a shift register having (N2+1) stages FF1, FF2,, . . . , FFN1, . . . FF(N2+1), a first input coupled to said source and a second input coupled to said generator means, said input signals being shifted through said shift register by said clock pulses, and gating means coupled to at least two consecutive stages of said shift register to produce said third signal upon detecting at least one of a plurality of allowable patterns of binary states of certain ones of said predetermined stages of said shift register, said allowable patterns Corresponding to stages FF1, FF$x$ and FF($x$+1) being in their binary "0", binary "1" and binary "0" states, in the order named, for a corresponding value of $x$, where $x$ equals N1 . . N2, and by any two successive stages of stages FF2 to FF($x$−1) not being in their binary "1" and binary "0" states simultaneously in the order named; and a counter coupled to said direction means responsive to each of said third signals, said counter counting to at least two and generating a recognition signal to indicate recognition of said input signals after having counted at least two of said third signals.

2. A system according to claim 1, wherein said gating means is coupled to stages of said shift register in a predetermined manner such that said third signals are produced upon detection of each of two of said allowable patterns determined by two consecutive values of $x$.

3. In a mark sensing organization a signal recognition system to recognize the presence of a plurality of two successive input signals nominally spaced by a first time interval T1 comprising:

a source of said input signals;

generator means to generate at least one series of clock pulses spaced by an amount equal to a second time interval T2, said second time interval being smaller than said first time interval, said generator means generates a first series of clock pulses and a second series of clock pulses, the frequency of said first series of clock pulses being a multiple of the frequency of said second series of clock pulses; and detection means coupled to said source and said generator means to produce a third signal indicating the presence of each of said plurality of said input signals having said first time interval varying between two predetermined limits, N1T2 and N2T2, each of said limits being determined by two different whole numbers N1 and N2 of said second time intervals, where N1T2 < T1 < N2T2 and N1 and N2 are predetermined positive integers with N2 > N1 > 1, said detection means including a storage means having a plurality of stages coupled to said source and said generator means responsive to said input signals and said first series of clock pulses, a first counter having (N2+1) stages coupled to said generator means responsive to said second series of clock pulses to count (N2+1) pulses thereof; and gating means coupled to predetermined stages of said storage means and at least two consecutive stages of said counter to detect the storage of said input signals in said storage means, to reset said counter, to enable the start of a new count and to produce said third signal when simultaneously said input signals are detected in said storage means and said counter has counted any one of the numbers N1 . . . N2.

4. A system according to claim 3, further including a second counter coupled to said gating means responsive to each of said third signals, said second counter counting to at least two and generating a recognition signal to indicate recognition of said input signals after having counted at least two of said third signals.

5. A system according to claim 3, wherein said storage means includes a shift register having at least a first stage, a second stage and a third stage, each of said stages having a binary "1" output and a binary "0" output; and said gating means includes an OR gate coupled to (N2−N1+1) successive stages of the first N2 stages of said counter, a first AND-gate coupled to said generator means responsive to said first series of clock pulses, to said "1" output of said first stage, to said "0" output of said second stage and to the output of said OR-gate, said first AND-gate producing said third signals, a second AND-gate coupled to said generator means responsive to said first series of clock pulses, to said "0" output of said third stage and said "1" output of said second stage, said second AND-gate having its output coupled to a reset input of said counter, an inverter coupled to the (N2+1)th stages of said counter, and a third AND-gate coupled to said generator means responsive to said second series of clock pulses and to said inverter, said third AND-gate having its output coupled to an input of said counter.

6. A system according to claim 5, further including a second counter coupled to said first AND-gate responsive to each of said third signals, said second counter counting to at least two and generating a recognition signal to indicate recognition of said input signals after having counted at least two of said third signals.

* * * * *